Sept. 28, 1954   A. H. ORCUTT   2,690,082

TAPE-ACTUATED MECHANISM

Filed May 7, 1952

Inventor
A. H. Orcutt
By Kent Downing Ruddl
Attys.

Patented Sept. 28, 1954

2,690,082

UNITED STATES PATENT OFFICE 2,690,082

TAPE-ACTUATED MECHANISM

Arthur Hitchcock Orcutt, Rowington Hall, near Warwick, England, assignor to The Gear Grinding Company Limited, Shirley, Birmingham, England Application May 7, 1952, Serial No. 286,465

Claims priority, application Great Britain May 11, 1951

2 Claims. (Cl. 74—95)

This invention relates to mechanisms of the kind in which a reciprocatory member and a rotary member are interconnected by a flexible metal or other tape or tapes for transmitting motion from either member to the other, and particularly mechanisms of the kind used in helical gear grinding or measuring machines.

The object of the invention is to provide such a mechanism in a form which will obviate risk of distortion of the reciprocatory member (and consequent impairment of the accuracy of the machine in which the mechanism is employed), by the tension of the tapes.

The invention comprises the combination with the rotary member and the reciprocatory member, of at least one tape attached at one end to the reciprocatory member and at the other end to the rotary member, and at least one other tape attached at one end to the rotary member and at the other end to a tensioning means on the reciprocatory member, the second tape being arranged to pass around a roller on the reciprocatory member.

Figure 1:
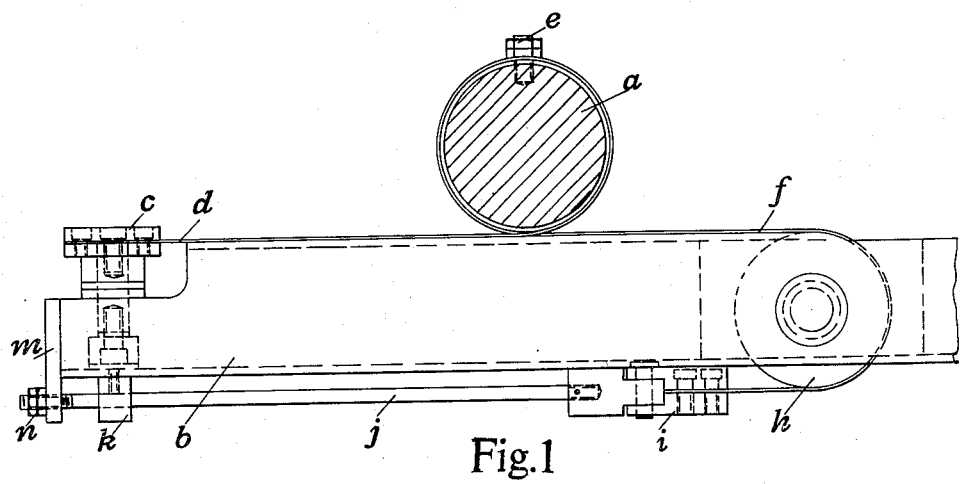
Figure 2:
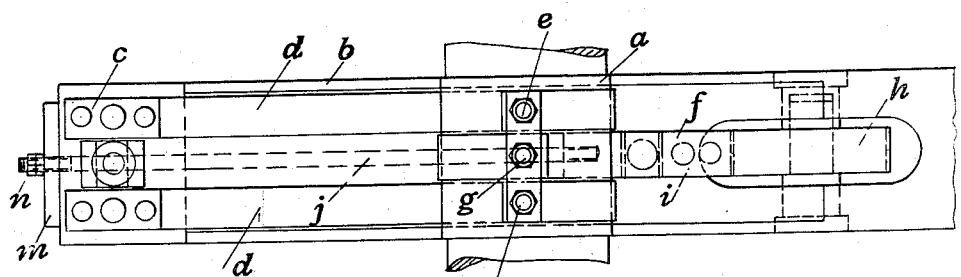

In the accompanying drawings:

Figures 1 and 2 are respectively a side elevation and plan of a mechanism embodying the invention.

Referring to the drawings, a cylindrical rotary member $a$ is arranged transversely across and adjacent to one side of a reciprocatory member $b$ of bar form, the portion of the bar associated with the tapes and rotary member being preferably of box-section. To one end of the reciprocatory member are secured by a clamp $c$ the ends of a pair of steel or other metal tapes $d$ arranged parallel with each other and extending along the surface of the portion of the reciprocatory member between the said end and the rotary member. The tapes then pass around the rotary member $a$ in anti-clockwise direction, their other ends being secured by screws $e$ or other means to a suitable part of the rotary member.

Another tape $f$ has one end secured by a screw $g$ or other means to the rotary member $a$ between and adjacent to the first mentioned tapes $d$. This other tape is passed around the other side of the rotary member in a clockwise direction and along the surface of the reciprocatory member in advance of the rotary member, to a roller $h$ carried on the reciprocatory member at any convenient short distance from the rotary member. After passing around one side of the roller, the other end of the tape is secured by a clamp $i$ to one end of a tensioning rod $j$ situated at the opposite side of and parallel with the reciprocatory member. The other end of the tensioning rod passes through a guide piece $k$ and is supported by a lug $m$ on the reciprocatory member at a position adjacent the clamping means $c$ of the first mentioned tapes. A nut $n$ on a screw-threaded end portion of the rod and abutting against one side of the lug serves to impart the required tension to the rod and tapes. Alternatively, any other convenient means may be provided for tensioning the tapes.

The operative part of the reciprocatory bar $a$ extends forwardly beyond the roller $h$ and is unaffected by the tension of the tapes.

Having thus described my invention what I claim as new and desire to secure by Letters Patent is:

1. A tape-actuated mechanism comprising in combination an elongated reciprocatory member, a cylindrical rotary member arranged transversely across one side of the reciprocatory member, at least one motion-transmitting tape passing in one direction around the rotary member and attached at opposite ends respectively to the reciprocatory and rotary members, tensioning means mounted on the side of the reciprocatory member remote from the rotary member, a roller carried by the reciprocatory member, and at least one other motion-transmitting tape passing around the rotary member in the opposite direction to the first mentioned tape and around the roller, the second mentioned tape being attached at opposite ends respectively to the rotary member and tensioning means.

2. A tape-actuated mechanism as claimed in claim 1, in which the tensioning means consists in part of an axially adjustable rod situated parallel with the reciprocatory member.

References Cited in the file of this patent

UNITED STATES PATENTS

| Number | Name | Date |
|---|---|---|
| 497,706 | Chase et al. | May 16, 1893 |
| 521,282 | Elliott | June 12, 1894 |
| 669,393 | Jent | Mar. 5, 1901 |
| 1,695,919 | Gould | Dec. 18, 1928 |
| 1,998,136 | Jaenichen | Apr. 16, 1935 |